(12) United States Patent
Wallet (10) Patent No.: US 10,338,249 B2
(45) Date of Patent: Jul. 2, 2019

(54) PROCESSING SEISMIC ATTRIBUTES USING MATHEMATICAL MORPHOLOGY

(71) Applicant: Schlumberger Technology Corporation, Sugar Land, TX (US)

(72) Inventor: Bradley Clark Wallet, Norman, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 312 days.

(21) Appl. No.: 14/781,985

(22) PCT Filed: Apr. 1, 2014

(86) PCT No.: PCT/US2014/032525
§ 371 (c)(1),
(2) Date: Oct. 2, 2015

(87) PCT Pub. No.: WO2014/165512
PCT Pub. Date: Oct. 9, 2014

(65) Prior Publication Data
US 2016/0047926 A1    Feb. 18, 2016

Related U.S. Application Data

(60) Provisional application No. 61/807,514, filed on Apr. 2, 2013.

(51) Int. Cl.
*G01V 1/30* (2006.01)
*G01V 1/34* (2006.01)

(52) U.S. Cl.
CPC ............. *G01V 1/307* (2013.01); *G01V 1/345* (2013.01); *G01V 2210/63* (2013.01); *G01V 2210/64* (2013.01)

(58) Field of Classification Search
CPC ..... G01V 1/307; G01V 2210/63; G01V 1/345
USPC .......................................................... 702/16
See application file for complete search history.

(56) References Cited

U.S. PATENT DOCUMENTS

| | | | | |
|---|---|---|---|---|
| 6,807,487 | B2 * | 10/2004 | Khan | G01V 1/40 367/905 |
| 7,069,149 | B2 * | 6/2006 | Goff | G01V 1/30 702/16 |
| 8,571,799 | B2 * | 10/2013 | Suarez-Rivera | G01V 9/00 367/31 |
| 2003/0112704 | A1 | 6/2003 | Goff et al. | |

(Continued)

FOREIGN PATENT DOCUMENTS

EP    1300803 A2    4/2003

OTHER PUBLICATIONS

International Search Report and Written Opinion for the equivalent International patent application PCT/US2014/032525 dated Aug. 1, 2014.

(Continued)

*Primary Examiner* — Stephanie E Bloss (57) ABSTRACT

Methods, systems, and computer-readable media are provided for processing seismic data. The method includes receiving a seismic data set associated with a domain, and calculating a seismic attribute associated with the domain from the seismic data set. The method also includes performing one or more mathematical morphology operations on the seismic attribute to generate a processed attribute associated with the domain.

33 Claims, 6 Drawing Sheets

(56) References Cited

U.S. PATENT DOCUMENTS

| | | | |
|---|---|---|---|
| 2006/0247558 A1 | 11/2006 | Yamada | |
| 2006/0247858 A1* | 11/2006 | Cacas | G01V 1/282 |
| | | | 702/2 |
| 2007/0014435 A1 | 1/2007 | Mirowski et al. | |
| 2012/0257476 A1* | 10/2012 | Muhl | G01V 1/325 |
| | | | 367/38 |
| 2013/0064040 A1 | 3/2013 | Imhof et al. | |
| 2014/0177390 A1* | 6/2014 | Can | G01V 1/302 |
| | | | 367/73 |

OTHER PUBLICATIONS

International Preliminary Report on Patentability for the equivalent International patent application PCT/US2014/032525 dated Oct. 15, 2015.

Office Action for the equivalent Mexican patent application MX/a/2015/013882 dated Mar. 28, 2017.

\* cited by examiner

PROCESSING SEISMIC ATTRIBUTES USING MATHEMATICAL MORPHOLOGY

BACKGROUND

Seismic attributes can be interpreted through a variety of manual, automated, and quantitative methods. However, certain attributes are based upon a calculation window, and thus challenges may arise with some interpretation methods in accurately localizing boundaries of geological bodies. This can be mitigated through the use of smaller calculation windows; however, smaller windows may also lead to more instability, resulting in increased variance within facies types.

Moreover, surface-based methods for interpreting the top and base of salt bodies can be time-consuming and prone to picking error, especially in the early stages of depth imaging while the velocity model is being refined. Volume-based interpretation approaches may be unbiased and data-driven, but seismic attributes, such as gray level co-occurrence matrix (GLCM), might not accurately define the local boundaries of geologic features such as high-contrast salt interfaces.

SUMMARY

Methods, systems, and computer-readable media are provided for processing seismic data. For example, the method may include receiving a seismic data set associated with a domain, and calculating a seismic attribute associated with the domain from the seismic data set. The seismic attribute may be, according to one specific example, a GLCM attribute. The method may also include performing one or more mathematical morphology operations on the seismic attribute to generate a processed attribute associated with the domain. For example, the one or more mathematical morphology operations may include an erosion operation and a dilation operation, which, in various applications, may be applied in either order, Further, the mathematical morphology operations may each proceed stepwise through the attribute, e.g., using a moving structuring operator. The mathematical morphology operations being applied to the seismic attribute may result in features that have greater homogeneity internally and/or increased boundary precision, and may reveal sedimentary occlusions and other objects internal to the features, among other things.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

In general, various aspects of the present disclosure may provide a method and system for post-attribute morphology operations that can be used to mitigate signal variance and thus provide a more consistent volumetric image of the salt body. The derived morphology volume may be employed, for example, in automatic volume extraction and maintaining local boundary integrity through reductions in the variance of the seismic attribute results.

As the term is used herein, "mathematical morphology" generally refers to the study of imagery and volumetric data, such as seismic data, through the use of geometric relationships. For example, mathematic morphology techniques may include the processing of such shape information based on lattice theory. In some cases, seismic amplitude and seismic attributes may have a lattice structure, e.g., they may be defined on a regularly spaced two-dimensional or three-dimensional grid.

Figure 1:
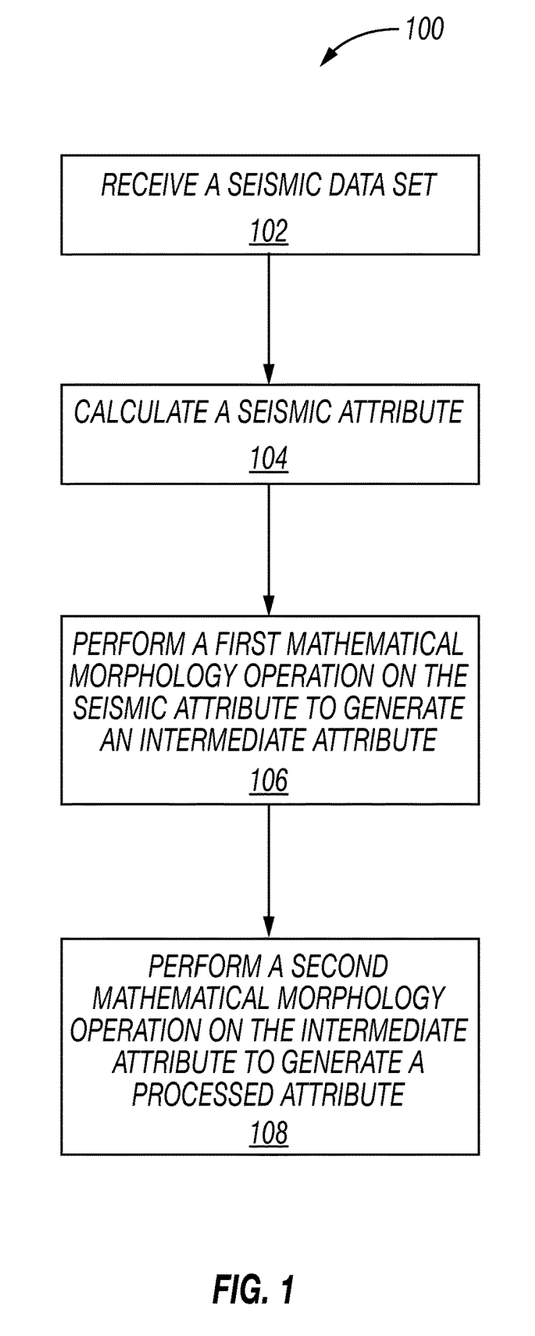
FIG. 1 illustrates a flowchart of a method for processing seismic data, according to an embodiment.

Turning now to the embodiments depicted in the Figures, FIG. 1 illustrates a flowchart of a method 100 for processing seismic data, according to an embodiment. The method 100 may begin by receiving a seismic data set associated with a domain, as at 102. The data may be collected in any way, for example, using geophones and any suitable, whether man-made or naturally-occurring, seismic wave generators. The result may be a depth image of a region of interest based on amplitude, velocity, or any other characteristic of the seismic waves and rock properties.

The method 100 may then proceed to calculating a seismic attribute based on the seismic data set for the domain, as at 104. One example of a seismic attribute is a gray level co-occurrence matrix (GLCM). An example GLCM includes a texture analysis technique, which estimates image properties related to second-order statistics. Each entry (i, j) in a GLCM corresponds to the number of occurrences of the pair of shaded levels i and j, which are a distance d apart, at an angle $\phi$, in the original image. Calculating the GLCM attribute can provide a display of the image that enhances areas with a deviation in intensity values or spatial arrangement with respect to the background texture, for example, making objects visibly stand out against the background. In some cases, this deviation can be remarkable.

Calculating the GLCM attribute may include defining levels of energy (also referred to as angular second moment) for elements of a matrix of the attribute. In other cases, however, the values for the units may correspond to entropy, contrast, and/or inverse difference moment. The levels may be characterized by values, e.g., normalized between 0 and 1, as with a probability density function. The values for these levels may then be associated with the elements of the GLCM based on the location of the elements in the domain.

In some embodiments, the seismic attribute calculated at 104 may be a seismic attribute other than GLCM, such as variance, chaos, sweetness, and RMS, among others. It will thus be appreciated that the description of the method 100 herein with respect to GLCM is one example among many contemplated.

Figure 2:
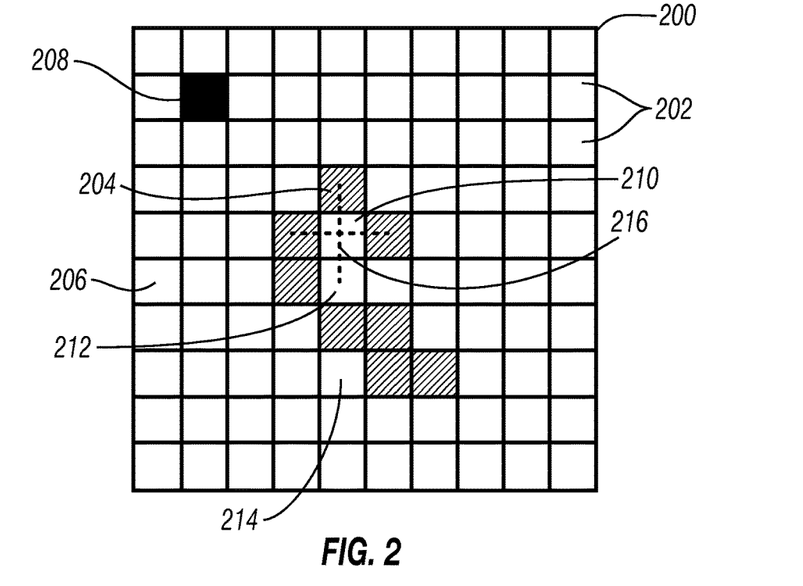
FIG. 2 illustrates an example of a domain of a seismic attribute, according to an embodiment.

FIG. 2 illustrates an example of a domain 200, according to an embodiment. Although illustrated as two-dimensional, it will be appreciated that the domain 200 may be representative of three or more dimensions. The domain 200 is partitioned into a matrix of discrete elements 202, with the discrete elements 202 representing the domain 200 based on a position in the domain 200. Each discrete element 202 may be associated with a value of the seismic attribute (e.g., GLCM or another seismic attribute). In the conceptual illustration of FIG. 2, a white element 206 may have a highest value, for example, two. A shaded element 204 may have a lower value, for example, one. A black element 208 may have the lowest value of the three, for example, zero. Although integer values are used in this description, it will be appreciated that any value may be employed. In some cases, the values may be normalized, such that the values are in the range [0, 1]. Moreover, it will be appreciated that four or more, for example, hundreds, thousands, or more, different values may be included in a given domain 200.

Several of the discrete elements 202 in FIG. 2 may serve as examples of the operation of the method 100, according to an embodiment. These discrete elements are elements 210, 212, and 214, and operations thereon will be described in greater detail below.

The method 100 may proceed to performing one or more mathematical morphology operations on the seismic attribute. Accordingly, in the embodiment illustrated in FIG. 1, the method 100 proceeds to performing a first mathematical morphology operation, as at 106. The first mathematical morphology operation may be or include an erosion operation or a dilation operation. Erosion followed by dilation may result in an "opening" operation, while dilation followed by erosion may result in a "closing" operation, as will be described in greater detail below. For purposes of illustration, the first mathematical morphology operation performed at 106 will be described with reference to an erosion operation. However, in other embodiments, other types of mathematical morphology operations may be performed at 106.

The erosion operation may be based on finding the local minimum or meet of a local subset of the matrix of discrete elements 202 making up the domain 200, e.g., based on lattice theory, as noted above. To find the meet, first the subset is defined. For example, a structuring operator 216 of a certain shape and size may be selected. When positioned in the domain 200, the structuring operator 216 may define the local subset as those discrete elements 202 intersected by the structuring operation 216. The discrete element 202 at the center, or from which the structuring operator 216 is otherwise defined or positioned, may be referred to as the "subject" element. The first mathematical morphology operation may thus proceed stepwise through the domain 200, with each of the discrete elements 202 (or a certain subset thereof) serving as the subject element from which the structuring operator 216 is positioned. An example of such a progression is described below.

Figure 3:
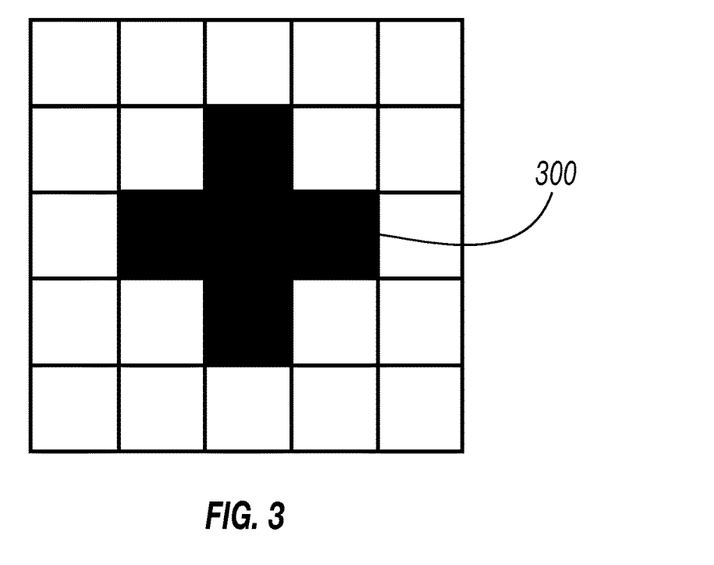
FIG. 3 illustrates a one-by-one, diamond-shaped structuring operator, according to an embodiment.
Figure 4:
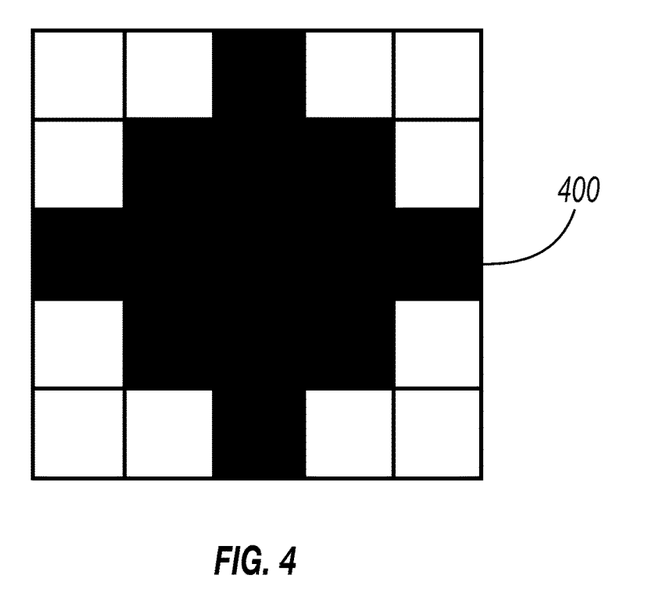
FIG. 4 illustrates a two-by-two, diamond-shaped structuring operator, according to an embodiment.

In various examples, the structuring operator 216 may be diamond-shaped, but in others may be irregularly-shaped, spherical, cubic, etc. Two examples of structuring operators are shown in FIGS. 3 and 4. FIG. 3 illustrates a one-by-one diamond-shaped structuring operator 300. FIG. 4 illustrates a two-by-two diamond structuring operator 400. For purposes of illustration, and not by way of limitation, the one-by-one structuring operator 300 is used for the structuring operator 216 described herein. It will be appreciated, however, that these two structuring operators 300, 400 are merely two examples among many sizes and shapes for the structuring element 216 that may be employed consistent with the present disclosure. Larger structuring operators 216 may result in fewer computations, and thus faster runtimes. However, if the structuring operator 216 is too large, the mathematical morphology operations of the present disclosure may result in relevant features of the domain 200 being lost. Accordingly, whether by trial-and-error (e.g., automatic or user-guided), prospectively determining an optimal size/shape for the structuring operator 216, or otherwise, the method 100 may include selecting a size and shape for the structuring operator 216 in the first mathematical morphology operation.

Returning to the specific example of the erosion operation, the value associated with each discrete element 202 serving as the subject element may be compared with the values associated with the discrete elements 202 of the local set (e.g., intersected by the structuring operator 216). The local minimum may be the smallest value associated with any of the discrete elements 202 of the local subset. If the value associated with the discrete element 202 acting as the subject element is greater than the local minimum, the value may be replaced by the local minimum. Accordingly, referring again to FIG. 2, the erosion operation may proceed by selecting one of the discrete elements 202, in this case, discrete element 210, as the subject element and placing the structuring operator 216 in the domain 200 based on the location of the subject element 210.

With the subject element 210 selected and the structuring operator 216 defining the local subset, the erosion operation may proceed by determining the minimum value of the discrete elements 202 within the neighborhood defined by the structuring operator 216 (e.g., the local minimum). If the local minimum is less than the value of the subject element 210, the erosion operation may include replacing the value of the subject element 210 with the local minimum value. Accordingly, for the illustrated element 210, the minimum value may be contained in the shaded elements 204 above, left, and right of the subject element 210. Since the subject element 210 is associated with a value that is greater than the local minimum (it begins as the higher-value white, as shown), the energy value associated with the subject element 210 is replaced with the energy value associated with one of the shaded elements 204. The same holds true when the elements 212 and 214 are the subject elements, since each begins as white and has adjacent elements that are shaded, indicating an association with a lower value. Similarly, all of the discrete elements 202 sharing an edge with the black element 208 are replaced with the value of the lower-energy black element 208.

Figure 5:
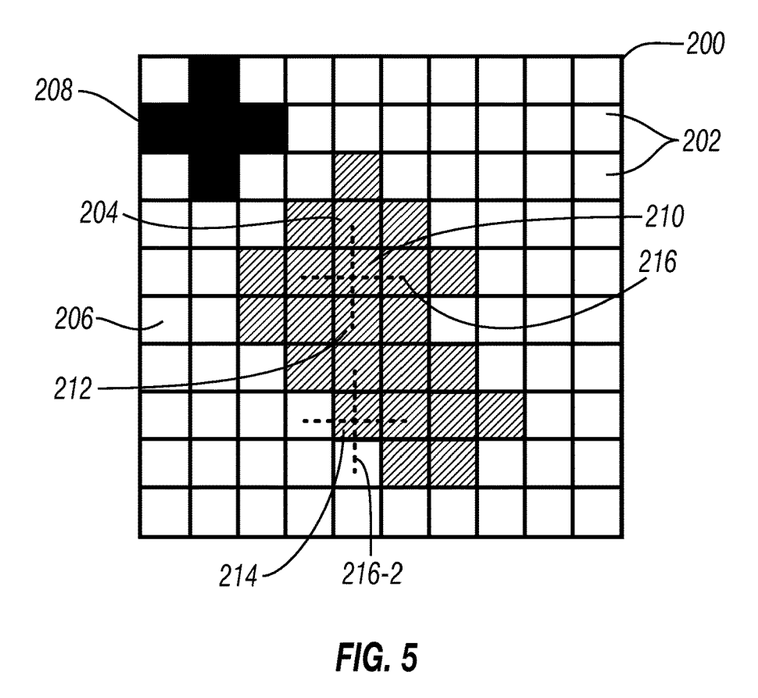
FIG. 5 illustrates an example of an intermediate seismic attribute, according to an embodiment.

FIG. 5 illustrates the domain 200 after the first mathematical morphology operation is performed. The discrete elements 202 may now have values associated with an "intermediate" seismic attribute, representing the results of the first mathematical morphology operation. Before continuing with the method 100, at this point, it will be appreciated that the determination of the local minimum for each discrete element 202 may be independent of determining the local minimum for the other discrete elements 202. Accordingly, in at least some cases, two matrices are stored: the matrix of elements 202 with values associated with the seismic attribute (FIG. 2), and the matrix of elements 202 of values associated with the intermediate seismic attribute (FIG. 5) that is built from the erosion operation. If the calculations for each subject element are not independent, the result may be an infinite impulse response filter.

With the calculations for each subject element being independent, the first mathematical morphology operation may thus be parallelized. Accordingly, calculating the local minimum for a first one of the discrete elements 202 may occur in one processor, while calculating the local minimum for another one of the discrete elements 202 may occur in another processor. Such distribution of operations may be expanded out to as many processors as are available and suitable. In some cases, multiple threads in the same processor may be additionally or instead employed for such parallelization. The results of the distributed operations may be collected and used to build the intermediate seismic attribute for the domain 200.

Referring again to FIG. 1, the method 100 may proceed to performing a second mathematical morphology operation, this time beginning with (or "on") the intermediate seismic attribute, as at 108. The second mathematical morphology operation may, in an example, be or include a pseudo-inverse process to the first mathematical morphology operation performed at 106. In the specific example of the first mathematical morphology operation being an erosion operation, the second mathematical morphology operation may be a dilation operation of the intermediate (eroded) seismic attribute.

Like erosion, dilation may also be based on the lattice theory, but may proceed by finding the join, or local maximum, of the energy values associated with the subset of the discrete elements 202 of the domain 200 intersected by the structuring operator. Once the local maximum is determined, it is compared to the value associated with the subject element. If the local maximum is greater than the value associated with the subject element, the value of the subject element is replaced with the local maximum. For example, the dilation operation may employ the same structuring operator 216, defining the neighborhood, as was employed in the erosion operation.

Referring again to FIG. 5 and again considering the element 210 as the subject element of the intermediate attribute, the values of the discrete elements 202 intersected or otherwise contained in the structuring operator 216 are the same as the value already associated with the element 210 acting as the subject element. As such, the subject element 210 is already associated with the maximum value; therefore, the value associated with the subject element 210 is not changed. In the conceptual view of FIG. 5, this means the subject element 210 remains shaded.

The discrete element 214 began as white in FIG. 2, and was changed by the erosion operation to a shaded element in the intermediate attribute, as shown in FIG. 5. However, when the second mathematical morphology operation is applied, the structuring element 216-2 based at the element 214 intersects higher-value white cells below and to the left, and thus the energy value associated with the element 214 is changed to the energy value associated with the white elements. Similarly, the elements in FIG. 2 that shared an edge with the black element 208 have adjacent white cells, which are intersected by a structuring operator 216 centered thereon, resulting in these elements being changed back to the local maximum, the white value.

Figure 6:
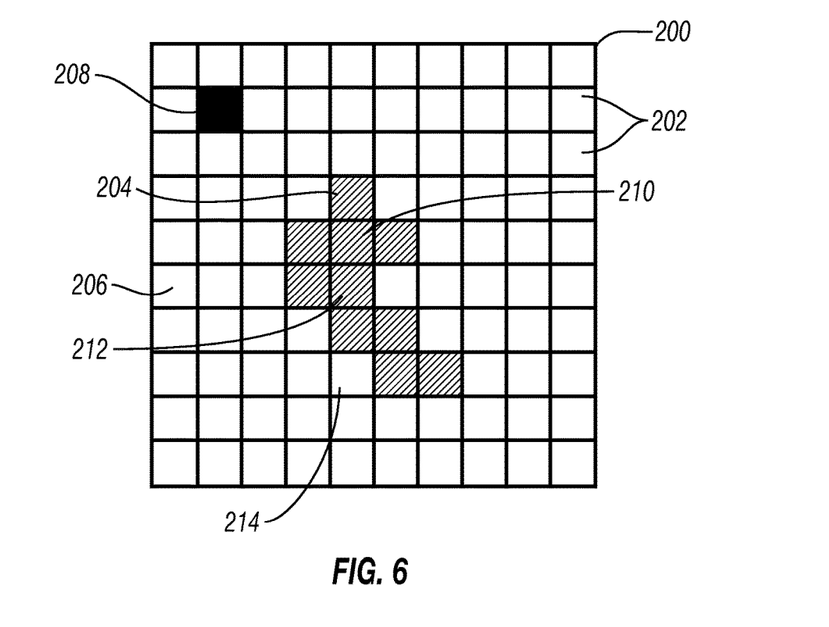
FIG. 6 illustrates an example of a processed seismic attribute, according to an embodiment.

The second mathematical morphology operation at 108 may thus generate the domain 200 with the discrete elements 202 associated with values of a processed attribute, as shown in FIG. 6. As just described, the four black elements surrounding black element 208 are once again conceptually depicted as white. Further, the element 214 returns to white, as do several other shaded elements from FIG. 5, generally at the edges of the group of shaded elements, as can be appreciated. However, the discrete elements 210 and 212 remain shaded, representing a change from the initial seismic attribute of FIG. 2.

As with the first mathematical morphology operation, the calculations of the second mathematical morphology operation may be independent for each of the discrete elements 202. Accordingly, the calculations making up the second mathematical morphology operation may be distributed across a plurality of processors, systems, threads, etc.

The discrete elements 210, 212 in FIG. 2, having been converted from white to shaded, are thus each considered to be sufficiently small in area (volume, etc.) and of a value that is inconsistent with their surrounding discrete elements 202, and according to an embodiment may be treated as instability or "noise" in the seismic attribute. Thus, the combination of the first and second mathematical morphology operations may serve to remove such instability.

As noted above, the example of an erosion operation followed by dilation may be referred to as an "opening" operation, while dilation followed by erosion may be referred to as a "closing" operation. Accordingly, it will be appreciated that the first mathematical morphology operation may be erosion, and may be conducted prior to the second mathematical morphology operation, which may be dilation (opening), but in other cases, dilation may be performed before erosion (closing). As shown, the resultant attribute image has had the high-energy areas in the center of the darker structure (e.g., the elements 210, 212 shown in FIGS. 2 and 5) removed and replaced with the values of the lower-energy discrete elements 202 around it, while still preserving the general boundaries of the objects represented by the different energy levels. This may result in features that have greater homogeneity internally and/or increased boundary precision, and may reveal sedimentary occlusions and other features internal to the features.

Figure 7:
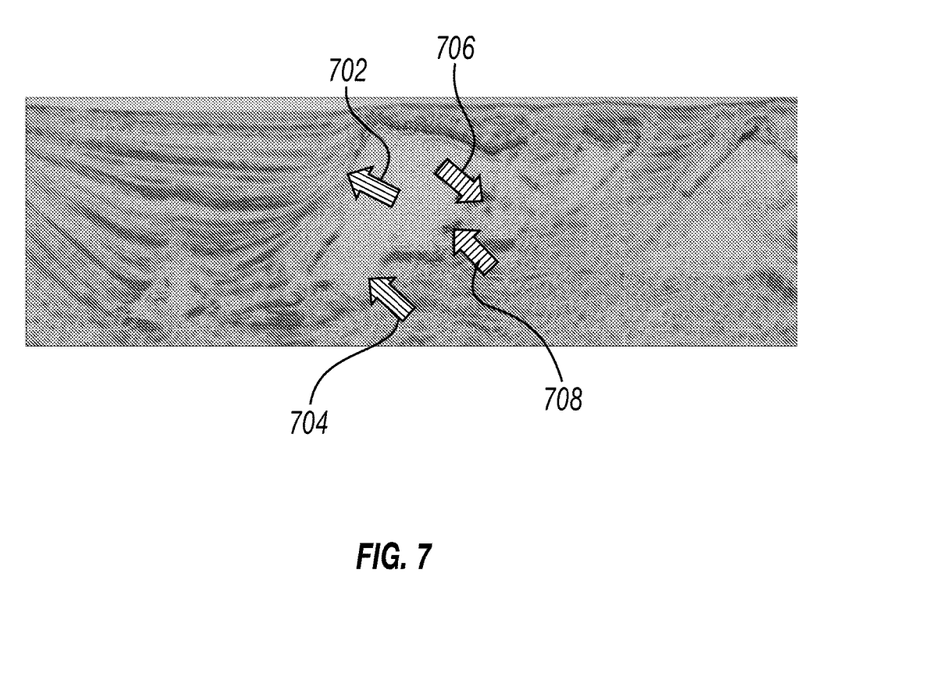
FIG. 7 illustrates an example of an unprocessed seismic image, according to an embodiment.

Workflows may be adapted to incorporate mathematical morphology to the attribute analysis of salt. Such workflows may involve calculating the GLCM seismic attribute and then applying either an opening or closing operation, for example, the opening process described above with respect to an embodiment of the method 100. The workflow may be applied to a data set from any region. FIG. 7 illustrates a representative crossline slice from this data set, showing salt bodies in a region. Interpretation of these bodies may involve obstacles including poorly imaged boundaries (as indicated by arrows 702, 704) and sedimentary inclusions (as indicated by arrows 706, 708). This attribute image shows salt canopies with a number of interpretation challenges including poorly-imaged boundaries and significant sedimentary inclusions in the salt bodies.

Figure 8:
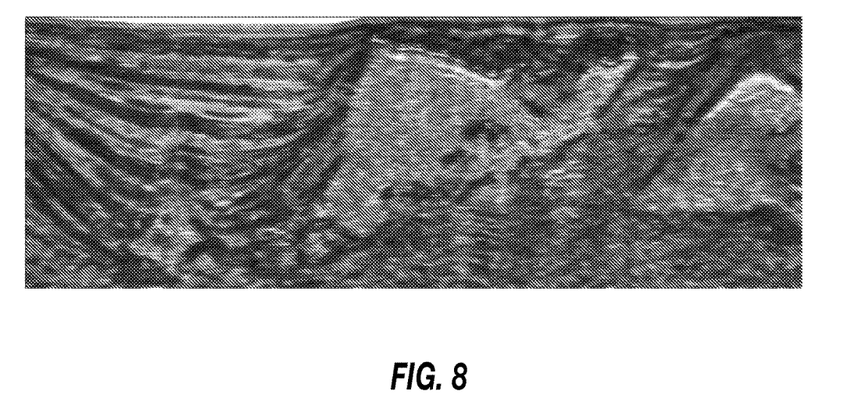
FIG. 8 illustrates an example of a GCLM seismic attribute of the seismic image, according to an embodiment.

The GLCM energy attributes may then be calculated (e.g., as at 104). A representative attribute from this set applied to the slice in FIG. 7 is shown in FIG. 8. In this case, GLCM has increased the interpretability of the poorly imaged boundaries, and it has more clearly outlined the sedimentary inclusions. However, in this example, the attribute within the salt body has a high degree of variance (i.e., the attribute lacks uniformity therein, which may make the boundaries more difficult to discern and/or may result in occlusions being more difficult to detect). This can present certain challenges in precisely interpreting the salt bodies, and it could make techniques such as cross-plotting difficult.

Figure 9:
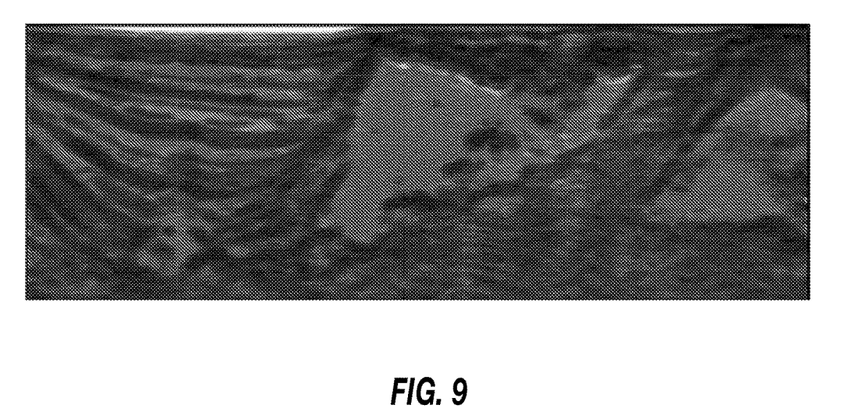
FIG. 9 illustrates an example of a GCLM seismic attribute after performing mathematical morphology operations, according to an embodiment.

An opening operation may then be provided (e.g., as at 106 and 108), thereby generating a processed (opened) attribute, as shown in FIG. 9. In this image, the variance within facies has been significantly reduced resulting in a data set with increased interpretability.

Figure 10:
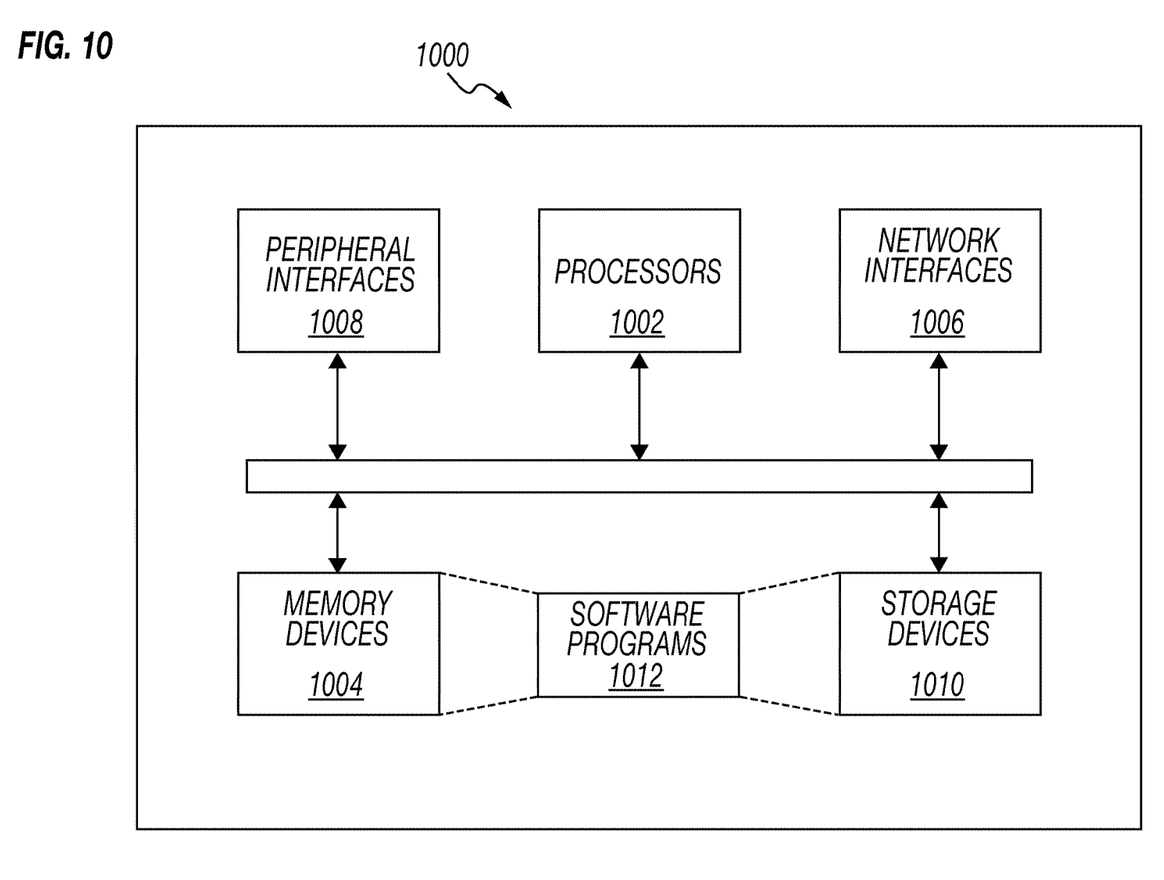
FIG. 10 illustrates a schematic view of a processor system, according to an embodiment.

Embodiments of the disclosure may also include one or more systems for implementing one or more embodiments of the method of the present disclosure. FIG. 10 illustrates a schematic view of such a computing or processor system 1000, according to an embodiment. The processor system 1000 may include one or more processors 1002 of varying core (including multiple core) configurations and clock frequencies. The one or more processors 1002 may be operable to execute instructions, apply logic, etc. It will be appreciated that these functions may be provided by multiple processors or multiple cores on a single chip operating in parallel and/or communicably linked together.

The processor system 1000 may also include a memory system, which may be or include one or more memory devices and/or computer-readable media 1004 of varying physical dimensions, accessibility, storage capacities, etc. such as flash drives, hard drives, disks, random access memory, etc., for storing data, such as images, files, and program instructions for execution by the processor 1002. In an embodiment, the computer-readable media 1004 may store instructions that, when executed by the processor 1002, are configured to cause the processor system 1000 to perform operations. For example, execution of such instructions may cause the processor system 1000 to implement one or more portions and/or embodiments of the method 100 described above. In such an example, the instructions of computer-readable media 1004 may cause the processor system 1000 to receive seismic data, calculate a GLCM seismic attribute, and/or perform one or more mathematical morphology operations on the GLCM seismic attribute. In on specific example, the instructions may cause the processor to erode the GLCM seismic attribute to produce an eroded attribute, and/or dilate the eroded attribute to produce a processed or "opened" (or "closed") attribute.

The processor system 1000 may also include one or more network interfaces 1006. The network interfaces 1006 may include any hardware, applications, and/or other software. Accordingly, the network interfaces 1006 may include Ethernet adapters, wireless transceivers, PCI interfaces, and/or serial network components, for communicating over wired or wireless media using protocols, such as Ethernet, wireless Ethernet, etc.

The processor system 1000 may further include one or more peripheral interfaces 1008, for communication with a display screen, projector, keyboards, mice, touchpads, sensors, other types of input and/or output peripherals, and/or the like. In some implementations, the components of processor system 1000 need not be enclosed within a single enclosure or even located in close proximity to one another, but in other implementations, the components and/or others may be provided in a single enclosure.

The memory device 1004 may be physically or logically arranged or configured to store data on one or more storage devices 1010. The storage device 1010 may include one or more file systems or databases in any suitable format. The storage device 1010 may also include one or more software programs 1012, which may contain interpretable or executable instructions for performing one or more of the disclosed processes. When requested by the processor 1002, one or more of the software programs 1012, or a portion thereof, may be loaded from the storage devices 1010 to the memory devices 1004 for execution by the processor 1002.

Those skilled in the art will appreciate that the above-described componentry is merely one example of a hardware configuration, as the processor system 1000 may include any type of hardware components, including any necessary accompanying firmware or software, for performing the disclosed implementations. The processor system 1000 may also be implemented in part or in whole by electronic circuit components or processors, such as application-specific integrated circuits (ASICs) or field-programmable gate arrays (FPGAs).

The foregoing description of the present disclosure, along with its associated embodiments and examples, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 1000 may be used to execute programs according to instructions received from another program or from another processor system altogether. Similarly, commands may be received, executed, and their output returned entirely within the processing and/or memory of the processor system 1000. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents. Further, in the above description and in the below claims, unless specified otherwise, the term "execute" and its variants are to be interpreted as pertaining to any operation of program code or instructions on a device, whether compiled, interpreted, or run using other techniques.

What is claimed is:

1. A computer-implemented method for processing seismic data, comprising:
    receiving a seismic data set associated with a domain representing a subterranean volume, wherein the seismic data set is collected using a geophone and a seismic wave generator;
    calculating a seismic attribute associated with the domain from the seismic data set; and
    performing one or more mathematical morphology operations on the seismic attribute to generate a processed attribute associated with the domain, wherein performing the one or more mathematical morphology operations comprises:
  performing a first mathematical morphology operation on the seismic attribute to generate an intermediate attribute, wherein performing the first mathematical morphology operation comprises:
    selecting a subject element from a matrix of elements representing the domain; and
    defining a local subset of the matrix of elements, wherein defining the local subset comprises applying a morphological structuring operator having a shape and a dimension; and
  performing a second mathematical morphology operation on the intermediate attribute to generate the processed attribute, wherein the second mathematical morphology operation comprises a pseudo-inverse of the first mathematical morphology operation.

2. The method of claim 1, wherein at least one of the one or more mathematical morphology operations comprises an erosion operation.

3. The method of claim 1, wherein at least one of the one or more mathematical morphology operations comprises a dilation operation.

4. The method of claim 1, wherein performing the first mathematical morphology operation comprises:
  selecting the subject element from the matrix of elements representing the domain, the subject element having a position in the domain and a value associated with the seismic attribute;
  defining the local subset of the matrix of elements based on the position of the subject element, the matrix of elements being associated with values associated with the seismic attribute;
  determining a local minimum of the local subset;
  determining that the value associated with the subject element is greater than the local minimum; and
  in response to determining that the value associated with the subject element is greater than the local minimum, replacing the value associated with the subject element with the local minimum.

5. The method of claim 4, wherein defining the local subset also comprises:
  positioning the morphological structuring operator in the matrix of elements based on the position of the subject element, wherein the matrix of elements that are intersected by the structuring element define the local subset.

6. The method of claim 5, wherein positioning the morphological structuring operator comprises centering the morphological structuring operator at the subject element.

7. The method of claim 4, wherein performing the second mathematical morphology operation comprises:
  selecting an intermediate subject element of the matrix of elements, the intermediate subject element having a position in the domain and a value associated with the intermediate attribute;
  defining an intermediate local subset of elements based on the position of the intermediate subject element, wherein each of the elements of the local subset of elements is associated with a value in the intermediate attribute;
  determining a local maximum of the values associated with the elements of the intermediate local subset;
  determining that the value associated with the intermediate subject element is less than the local maximum; and
  in response to determining that the value associated with the intermediate subject element is less than the local maximum, replacing the value associated with the subject element with the local maximum.

8. The method of claim 7, wherein defining the intermediate local subset comprises:
  selecting a second morphological structuring operator having a second shape and a second dimension; and
  positioning the second morphological structuring operator in the matrix of elements, wherein the matrix of elements are associated with values of the intermediate attribute.

9. The method of claim 1, wherein calculating the seismic attribute comprises calculating a Gray Level Co-occurrence Matrix (GLCM) seismic attribute.

10. The method of claim 1, further comprising displaying the processed attribute.

11. The method of claim 1, further comprising:
  generating a first seismic image of the domain using the seismic attribute; and
  generating a second seismic image of the domain using the processed seismic attribute.

12. The method of claim 1, wherein the seismic attribute comprises a lattice structure.

13. The method of claim 1, further comprising generating an image of the processed attribute, wherein the image comprises a volumetric image of a salt body.

14. A non-transitory computer-readable medium storing instructions that, when executed by a processor, cause the processor to perform operations, the operations comprising:
  receiving a seismic data set associated with a domain representing a subterranean volume, wherein the seismic data set is collected using a geophone and a seismic wave generator;
  calculating a seismic attribute associated with the domain from the seismic data set; and
  performing one or more mathematical morphology operations on the seismic attribute to generate a processed attribute associated with the domain, wherein performing the one or more mathematical morphology operations comprises:
    performing a first mathematical morphology operation on the seismic attribute to generate an intermediate attribute, wherein performing the first mathematical morphology operation comprises:
      selecting a subject element from a matrix of elements representing the domain; and
      defining a local subset of the matrix of elements, wherein defining the local subset comprises applying a morphological structuring operator having a shape and a dimension; and
    performing a second mathematical morphology operation on the intermediate attribute to generate the processed attribute, wherein the second mathematical morphology operation comprises a pseudo-inverse of the first mathematical morphology operation.

15. The medium of claim 14, wherein at least one of the one or more mathematical morphology operations comprises an erosion operation.

16. The medium of claim 14, wherein at least one of the one or more mathematical morphology operations comprises a dilation operation.

17. The medium of claim 14 wherein performing the first mathematical morphology operation comprises:

selecting the subject element from the matrix of elements representing the domain, the subject element having a position in the domain and a value associated with the seismic attribute;
defining the local subset of the matrix of elements based on the position of the subject element, the matrix of elements being associated with values associated with the seismic attribute;
determining a local minimum of the local subset;
determining that the value associated with the subject element is greater than the local minimum; and
in response to determining that the value associated with the subject element is greater than the local minimum, replacing the value associated with the subject element with the local minimum.

18. The medium of claim 17, wherein defining the local subset also comprises:
positioning the morphological structuring operator in the matrix of elements based on the position of the subject element, wherein the matrix of elements that are intersected by the structuring element define the local subset.

19. The medium of claim 18, wherein positioning the morphological structuring operator comprises centering the morphological structuring operator at the subject element.

20. The medium of claim 17, wherein performing the second mathematical morphology operation comprises:
selecting an intermediate subject element of the matrix of elements, the intermediate subject element having a position in the domain and a value associated with the intermediate attribute;
defining an intermediate local subset of elements based on the position of the intermediate subject element, wherein each of the elements of the local subset of elements is associated with a value in the intermediate attribute;
determining a local maximum of the values associated with the elements of the intermediate local subset;
determining that the value associated with the intermediate subject element is less than the local maximum; and
in response to determining that the value associated with the intermediate subject element is less than the local maximum, replacing the value associated with the subject element with the local maximum.

21. The medium of claim 20, wherein defining the intermediate local subset comprises:
selecting a second morphological structuring operator having a second shape and a second dimension; and
positioning the morphological second structuring operator in the matrix of elements, wherein the matrix of elements are associated with values of the intermediate attribute.

22. The medium of claim 14, wherein calculating the seismic attribute comprises calculating a Gray Level Co-occurrence Matrix (GLCM) seismic attribute.

23. The medium of claim 14, wherein the operations further comprising displaying the processed attribute.

24. A computing system, comprising:
one or more processors; and
a memory system comprising one or more computer-readable media storing instructions that, when executed by at least one of the one or more processors, cause the computing system to perform operations, the operations comprising:
receiving a seismic data set associated with a domain representing a subterranean volume, wherein the seismic data set is collected using a geophone and a seismic wave generator;
calculating a seismic attribute associated with the domain from the seismic data set; and
performing one or more mathematical morphology operations on the seismic attribute to generate a processed attribute associated with the domain, wherein performing the one or more mathematical morphology operations comprises:
performing a first mathematical morphology operation on the seismic attribute to generate an intermediate attribute, wherein performing the first mathematical morphology operation comprises:
selecting a subject element from a matrix of elements representing the domain; and
defining a local subset of the matrix of elements, wherein defining the local subset comprises applying a morphological structuring operator having a shape and a dimension; and
performing a second mathematical morphology operation on the intermediate attribute to generate the processed attribute, wherein the second mathematical morphology operation comprises a pseudo-inverse of the first mathematical morphology operation.

25. The system of claim 24, wherein at least one of the one or more mathematical morphology operations comprises an erosion operation.

26. The system of claim 24, wherein at least one of the one or more mathematical morphology operations comprises a dilation operation.

27. The system of claim 24, wherein the first mathematical morphology operation comprises:
selecting the subject element from the matrix of elements representing the domain, the subject element having a position in the domain and a value associated with the seismic attribute;
defining the local subset of the matrix of elements based on the position of the subject element, the matrix of elements being associated with values associated with the seismic attribute;
determining a local minimum of the local subset;
determining that the value associated with the subject element is greater than the local minimum; and
in response to determining that the value associated with the subject element is greater than the local minimum, replacing the value associated with the subject element with the local minimum.

28. The system of claim 27, wherein performing the second mathematical morphology operation comprises:
selecting an intermediate subject element of the matrix of elements, the intermediate subject element having a position in the domain and a value associated with the intermediate attribute;
defining an intermediate local subset of elements based on the position of the intermediate subject element, wherein each of the elements of the local subset of elements is associated with a value in the intermediate attribute;
determining a local maximum of the values associated with the elements of the intermediate local subset;
determining that the value associated with the intermediate subject element is less than the local maximum; and
in response to determining that the value associated with the intermediate subject element is less than the local maximum, replacing the value associated with the subject element with the local maximum.

29. The system of claim 28, wherein defining the intermediate local subset comprises:
selecting a second morphological structuring operator having a second shape and a second dimension; and
positioning the second morphological structuring operator in the matrix of elements, wherein the matrix of elements are associated with values of the intermediate attribute.

30. The system of claim 27, wherein defining the local subset also comprises:
positioning the morphological structuring operator in the matrix of elements based on the position of the subject element, wherein the matrix of elements that are intersected by the structuring element define the local subset.

31. The system of claim 30, wherein positioning the morphological structuring operator comprises centering the morphological structuring operator at the subject element.

32. The system of claim 24, wherein calculating the seismic attribute comprises calculating a Gray Level Co-occurrence Matrix (GLCM) seismic attribute.

33. The system of claim 24, wherein the operations further comprise displaying the processed attribute.

* * * * *